United States Patent [19]

Streusand et al.

[11] Patent Number: 4,544,696

[45] Date of Patent: Oct. 1, 1985

[54] SILICONE ELASTOMERS HAVING THERMALLY CONDUCTIVE PROPERTIES

[75] Inventors: Marie J. Streusand, Saline; John C. Getson, Adrian; Richard C. McAfee, Tecumseh, all of Mich.

[73] Assignee: SWS Silicones Corporation, Adrian, Mich.

[21] Appl. No.: 665,484

[22] Filed: Oct. 29, 1984

[51] Int. Cl.$^4$ .............................................. C08K 3/28
[52] U.S. Cl. .................................... 524/428; 524/789; 524/861; 524/862; 525/478; 528/15; 528/31; 528/32
[58] Field of Search ............................ 528/15, 31, 32; 524/428, 789, 861, 862; 525/478

[56] References Cited

U.S. PATENT DOCUMENTS 4,255,316 3/1981 Blizzard .............................. 524/430
4,472,591 9/1984 Schilling, Jr. et al. ............. 556/430

Primary Examiner—Melvyn I. Marquis

[57] ABSTRACT

Silicone elastomers having thermally conductive properties which comprise an organopolysiloxane having Si-bonded aliphatically unsaturated groups, an organohydrogenpolysiloxane having Si-bonded hydrogen atoms, a catalyst capable of promoting the addition of Si-bonded hydrogen to Si-bonded aliphatically unsaturated groups and from about 30 to 95 percent by weight of filler, based on the weight of the composition, of which at least 10 percent by weight of the filler is silicon nitride particles.

17 Claims, No Drawings

SILICONE ELASTOMERS HAVING THERMALLY CONDUCTIVE PROPERTIES

The present invention relates to silicone elastomers having thermally conductive properties and more particularly to curable organopolysiloxane compositions containing thermally conductive particles.

BACKGROUND OF THE INVENTION

Various materials have been incorporated in organopolysiloxane compositions to improve the thermal conductivity of the resultant elastomers. For example, U.S. Pat. No. 3,499,856 to Matherly discloses adding boron nitride particles to a room temperature vulcanizable organopolysiloxane composition to form a thermally conductive silicone rubber. Also, U.S. Pat. No. 4,292,225 to Theodore et al describes highly filled organopolysiloxane compositions containing boron refractory powders which have good thermally conductive properties.

In contrast to the teachings of U.S. Pat. Nos. 3,499,856 and 4,292,225, it has been found that organopolysiloxane compositions having increased filler loadings of silicon nitride particles provide elastomers having desirable physical properties as well as excellent thermal conductivity. Moreover, the compositions of this invention are useful for insulating electrical components because they permit any heat which is generated to be conducted away from the electrical component. Furthermore, the compositions of this invention are unique in that filler loadings in excess of 60 percent by weight based on the weight of the composition can be achieved using silicon nitride particles and the resultant elastomers have superior thermal conductivity and desirable physical properties.

It is, therefore, an object of this invention to provide a highly filled thermally conductive vulcanizable organopolysiloxane composition containing silicon nitride particles. Another object of this invention is to provide a thermally conductive elastomer having unique physical properties by virtue of the use of increased filler loadings of silicon nitride particles. Still another object of this composition is to provide a highly filled organopolysiloxane composition which is sufficiently pliable that it can be injection molded or extruded and cured. A further object of this invention is to provide highly filled silicone elastomers having increased filler loadings and having improved thermal conductivity.

SUMMARY OF THE INVENTION

The foregoing objects and others which will become apparent from the following descriptions are accomplished in accordance with this invention, generally speaking, by providing curable compositions containing
(a) an organopolysiloxane having an average of at least two aliphatically unsaturated monovalent hydrocarbon radicals;
(b) an organohydrogenpolysiloxane having at least two silicon-bonded hydrogen atoms per molecule;
(c) a catalyst which is capable of promoting the addition of silicon-bonded hydrogen to the aliphatically unsaturated monovalent hydrocarbon radicals; and
(d) from about 30 to 95 percent by weight of filler based on the weight of the composition, of which at least 10 percent by weight of the filler is silicon nitride particles.

The resultant composition forms an elastomer having desirable physical properties and thermal conductivity.

DESCRIPTION OF THE INVENTION

The organopolysiloxanes employed in the compositions of this invention generally contain recurring units of the formula $$R_xSiO_{(4-x/2)}$$

where R is selected from the group consisting of monovalent hydrocarbon radicals and halogenated monovalent hydrocarbon radicals in which an average of at least two of the monovalent hydrocarbon radicals contain aliphatically unsaturated groups per molecule and x is an integer of from 1 to 3, with an average value of from about 1.7 to about 2.1.

It is preferred that the hydrocarbon radicals and substituted hydrocarbon radicals represented by R each contain from 1 to 18 carbon atoms. Examples of suitable hydrocarbon radicals are alkyl radicals, such as the methyl, ethyl, n-propyl and isopropyl radicals, as well as the octadecyl radicals; cycloalkyl radicals such as the cyclohexyl and the cycloheptyl radicals; aryl radicals such as the phenyl radical; alkaryl radicals such as the tolyl radicals and aralkyl radicals such as the benzyl and the beta-phenylethyl radicals. Examples of substituted hydrocarbon radicals represented by R are halogenated hydrocarbon radicals, such as the 3,3,3-trifluoropropyl radical and o-, m- and p-chlorophenyl radicals. Because of their availability, it is preferred that at least 80 percent of the R radicals be methyl radicals.

Examples of hydrocarbon radicals having aliphatic unsaturated are vinyl, allyl, methallyl and butadienyl radicals, with vinyl being the preferred radical.

These organopolysiloxanes preferably have a viscosity of from about 5 to 500,000 mPa.s at 25° C. and more preferably from about 40 to about 100,000 mPa.s at 25° C.

The organopolysiloxanes employed in the compositions of this invention are produced by the hydrolysis and condensation of the corresponding hydrolyzable silanes. These organopolysiloxanes are preferably linear polymers containing diorganosiloxane units of the formula $R_2SiO$; however, these polymers may also contain minor amounts of other units, such as $RSiO_{3/2}$ units, $R_3SiO_{0.5}$ and/or $SiO_{4/2}$ units, in which R is the same as above.

The preferred organopolysiloxane is a diorganopolysiloxane having the general formula

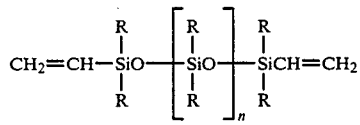

where n is a number such that the organopolysiloxane has a viscosity of from about 40 to 100,000 mPa.s at 25° C.

The organohydrogenpolysiloxanes employed in the compositions of this invention generally consist of units of the general formula $$R'_mSiO_{(4-m/2)}$$

where R' represents hydrogen, a monovalent hydrocarbon radical or a halogenated monovalent hydrocarbon radical having from 1 to 18 carbon atoms, in which at least two and preferably three Si-bonded hydrogen atoms are present per molecule and n is 1, 2 or 3. Preferred compounds are those consisting of RSiO- units, $R_2SiO$- and $R_3SiO_{0.5}$- units, in which an Si-bonded hydrogen atom is present for each 3 to 100 silicon atoms and R is the same as above. It is preferred that the organohydrogenpolysiloxanes have a viscosity of from about 10 to 50,000 mPa.s and more preferably from 100 to 20,000 mPa.s at 25° C.

The organohydrogenpolysiloxanes may also contain monovalent hydrocarbon radicals having aliphatic unsaturation as well as Si-bonded hydrogen atoms in the same molecule.

It is preferred that the organohydrogenpolysiloxanes contain from 0.01 to about 1.7 percent by weight of Si-bonded hydrogen atoms, and the silicon valences not satisfied by hydrogen atoms or siloxane oxygen atoms are satisfied by unsubstituted or substituted monovalent hydrocarbon radicals free of aliphatic unsaturation.

The organohydrogenpolysiloxanes having an average of at least 2 Si-bonded hydrogen atoms per molecule are preferably present in the compositions of this invention in an amount of from about 0.1 to about 15 Si-bonded hydrogen atoms per aliphatically unsaturated group.

The platinum catalyst employed in this invention may consist of finely dispersed platinum as well as platinum compounds and/or platinum complexes which have been used heretofore to promote the addition of Si-bonded hydrogen atoms to compounds having aliphatically unsaturated groups.

Examples of catalysts which can be used in this invention are finely dispersed platinum on carriers, such as silicon dioxide, aluminum oxide or activated charcoal, platinum halides, such as $PtCl_4$, chloroplatinic acid and $Na_2PtCl_4.nH_2O$, platinum-olefin complexes, for example, those with ethylene, propylene or butadiene, platinum-alcohol complexes, platinum-styrene complexes such as those described in U.S. Pat. No. 4,394,317 to McAfee et al, platinum-alcoholate complexes, platinum-acetylacetonate, reaction products comprising chloroplatinic acid and monoketones, for example, cyclohexanone, methyl ethyl ketone, acetone, methyl-n-propyl ketone, diisobutyl ketone, acetophenone and mesityl oxide, as well as platinum-vinylsiloxane complexes, such as platinum-divinyltetramethyldisiloxane complexes with or without a detectable amount of inorganic halogen.

Mixtures of various platinum catalysts, for example, a mixture consisting of the reaction product of chloroplatinic acid and cyclohexanone and a platinum-divinyltetramethyldisiloxane complex which is free of detectable inorganic halogen may be used in the compositions of this invention.

The platinum catalyst is generally employed in an amount of from about 0.5 to 300 ppm by weight and more preferably from about 2 to 50 ppm by weight calculated as platinum and based on the weight of the silicon compounds.

The silicon nitride particles employed in the compositions of this invention are polycrystalline or amorphous materials having an average particle size of from about 0.5 to about 350 microns and more preferably from about 40 to 250 microns. The particle size is not critical as long as the particles are not so large as to be difficult to mix with the organopolysiloxane to form a homogeneous mixture.

The silicon nitride particles may be used with other fillers such as reinforcing fillers, i.e., fillers having a surface area of at least 50 $m^2$/gm. Examples of such fillers are precipitated silicon dioxide having a surface area of at least 50 $m^2$/gm and/or pyrogenically produced silicon dioxide. Examples of other reinforcing fillers are the aerogels, alumina, carbon blacks and graphite.

A portion of the fillers can be semi- or non-reinforcing fillers, i.e., fillers which have a surface area of less than 50 $m^2$/gm. Examples of semi- or non-reinforcing fillers are metal oxides, metal nitrides, cork, organic resins, polytetrafluoroethylene, polychlorotrifluoroethylene, polyvinyl chloride, carbon black, graphite, bentonite, diatomaceous earth, crushed quartz, mica, metal fibers, glass beads, bubbles or fibers and mixtures thereof. Preferred examples of metal oxides are zinc oxide, ferric oxide, alumina and titanium oxide. The fillers may also be treated with, for example, triorganoalkoxysilanes, such as trimethylethoxysilane to coat the surfaces with organosiloxy groups.

The amount of fillers including silicon nitride particles which may be incorporated in the compositions of this invention is not critical and may vary over a wide range. Thus, the amount of filler including silicon nitride particles may range from about 30 to 95 percent by weight and more preferably from 40 to 90 percent by weight, based on the weight of the composition, of which at least 10 percent by weight of the filler is silicon nitride particles. More preferably, the amount of silicon nitride particles may range from about 30 to 100 percent by weight based on the weight of the filler. It is, however, preferred that the filler not interfere with the thermal conductivity of the composition.

Other additives which may be incorporated in the compositions of this invention include pigments, compression set additives, oxidation inhibitors, plasticisers, adhesion promoters, base stabilizers and other materials commonly employed as additives in the silicone rubber art. Such additives are preferably present in an amount below about 15 percent by weight based on the weight of the composition.

The compositions of this invention are prepared by mixing the organopolysiloxane containing aliphatic unsaturation with the organohydrogenpolysiloxane in the desired proportions and the desired amount of catalyst is added and the reaction mixture is maintained at the desired reaction temperature for sufficient time to effect the addition of the Si-bonded hydrogen atoms across the multiple bonds of the aliphatically unsaturated organopolysiloxane. The relative amounts of the Si-bonded hydrogen containing compound and the compound containing aliphatic unsaturation can vary within extremely wide limits. Theoretically, one Si-bonded hydrogen atom is equivalent to one olefinic double bond. For many purposes, however, it may be desirable to employ an excess of one of the reactants to facilitate the completion of the reaction or to insure that the reaction product still contains either unreacted Si-bonded hydrogen atoms or aliphatically unsaturated groups. Because of the high activity of the platinum catalysts, some degree of reaction often occurs at room temperature as soon as the catalyst is mixed with the reactants. Thus, the reaction temperature can be room temperature or even at a temperature as low as 0° C. Likewise, a reaction temperature on the order of from 150° to 300° C. can be employed. Preferably, however, the reaction is effected at temperatures in the range of from about 50° to 150° C. The time required for effecting the reaction depends on such things as the reactants employed and the amount and type of catalyst employed.

In some cases, it is desirable to employ a diluent for the catalyst and/or one or both reactants. The diluent should be inert to the reactants and catalyst under the reaction conditions. Examples of suitable diluents are organopolysiloxanes such as trimethylsiloxy-terminated dimethylpolysiloxanes and organic solvents which vaporize at low temperatures. Examples of suitable organic solvents are chlorinated hydrocarbons such as trichloroethylene. When organic solvents are employed, they are preferably employed in an amount of less than 20 percent by weight based on the weight of the organopolysilxoane composition.

The addition of the Si-bonded hydrogen atoms to the aliphatically unsaturated groups may be inhibited or at least controlled by the addition of an inhibitor to the composition. Various compounds which may be used to inhibit platinum catalyzed addition reactions are benzotriazole; acetylenic compounds such as acetylenically unsaturated secondary or tertiary alcohols and siloxanes such as 1,3-divinyl-1,1,3,3-tetramethyldisiloxane. Other compounds which may be employed are tetramethylquanidine acetate, ethylenically unsaturated isocyanurate, phenylhydrazine, a diaziridine, dithiocarbamic acids, thiuram monosulfides, 2-mercaptobenzothiazole and the like.

The amount of inhibitor used may be varied depending on such characteristics as the type and amount of platinum catalyst used, the degree of inhibition desired to be imparted to the platinum catalyst and often the type of unsaturated polysiloxane and hydrogen polysiloxane employed. Generally, the amount of inhibitor employed can range from about 0.001 to about 6 percent by weight and more preferably from about 0.01 to about 5 percent by weight based on the weight of the composition.

The compositions of this invention can be used for insulating electrical components where it is desirable to remove the heat from the source. These compositions are especially useful in encapsulating semiconductors since they both insulate and conduct the heat away from the semiconductor. These compositions may also be injection molded to form thermally conductive pads for use in various electrical applications.

In the following examples, all parts and percentages are by weight unless otherwise specified.

Preparation of platinum-styrene complex

The platinum-styrene complex used in the following examples is prepared by adding 6 parts of sodium bicarbonate to a mixture containing 3 parts of chloroplatinic acid ($H_2PtCl_6.6H_2O$), 6 parts of styrene and 50 parts of ethanol. The mixture is heated to reflux temperature (about 55° C.), and then refluxed for about 35 minutes with agitation, and then cooled to room temperature. The resultant mixture is filtered and the crystals thus obtained washed with about 30 parts of acetone. After adding about 30 parts of xylene to the filtrate, orange crystals are formed. These crystals are filtered, recovered and dried. The crystals are dissolved in sufficient isopropanol to form a solution containing 0.75 percent by weight of elemental platinum.

EXAMPLE 1

(a) An organopolysiloxane composition is prepared by mixing 20 parts of a vinyl-terminated dimethylpolysiloxane having a viscosity of about 600 mPa.s at 25° C. and having a vinyl content of about 0.4 weight percent with 80 parts of 325 mesh silicon nitride particles (available from Afrimet-Indussa, Inc.).

(b) About 100 parts of the organopolysiloxane composition prepared in (a) above are mixed with 2 parts of a methylhydrogenpolysiloxane having an Si:H mole ratio of 3:2 and 0.1 part of a methylvinylsiloxane having an Me:Vi mole ratio of 1:1 to form a homogeneous composition. A sufficient quantity of the platinumstyrene complex catalyst prepared above is added to the resultant composition so that the composition contains about 10 ppm of elemental platinum. The resulting composition, which contains about 76 percent by weight of silicon nitride particles, is molded into ASTM slabs and cured for 30 minutes at 175° C.

The physical properties of the cured composition are shown below. The thermal conductivity is determined in accordance with the procedure described in ASTM D-2214.

| Physical Properties | |
| --- | --- |
| Tensile strength, p.s.i. | 755 |
| Elongation, percent | 25 |
| Durometer, Shore A | 92 |
| Tear Strength lb./in. | 38 |
| Thermal Conductivity, cal. cm.$^{-1}$ sec.$^{-1}$ °C.$^{-1}$ | $1 \times 10^{-3}$ |

EXAMPLE 2

(a) A polysiloxane composition is prepared by mixing 33 parts of a vinyl-terminated dimethylpolysiloxane having a viscosity of 900 mPa.s at 25° C. and a vinyl content of 0.4 weight percent with 66 parts of calcium silicate and 1 part of a methylvinyldimethylpolysiloxane having a viscosity of 300,000 mPa.s at 25° C. and containing 2 percent by weight of a platinum complex of gamma picoline dichloride.

(b) About 100 parts of the polysiloxane composition prepared in Example 2(a) above are mixed with 350 parts of the polysiloxane composition prepared in Example 1(a) above and the resultant mixture then mixed with about 2.0 parts of a methylhydrogenpolysiloxane having an Si:H mole ratio of 3:2 to form a homogeneous composition. The resultant composition is molded into ASTM slabs and cured in accordance with Example 1. The physical properties are shown below.

| Physical Properties | |
| --- | --- |
| Tensile strength, p.s.i. | 660 |
| Elongation, percent | 71 |
| Durometer, Shore A | 82 |
| Tear strength, lb./in. | 56 |
| Thermal conductivity, cal. cm.$^{-1}$ sec.$^{-1}$ °C.$^{-1}$ | $7.8 \times 10^{-4}$ |

EXAMPLE 3

(a) The procedure of Example 1(a) is repeated except that 69 parts of silicon nitride particles are mixed with 30.3 parts of the vinyl-terminated dimethylpolysiloxane.

(b) About 1.7 parts of a methylhydrogenpolysiloxane having an Si:H mole ratio of 3:2 is added to the mixture prepared in Example 3(a) above. The resultant composition is mixed with the platinum styrene complex in such an amount that the composition contains 10 ppm of elemental platinum, then formed into ASTM slabs and cured for 30 minutes at 175° C.

The physical properties are illustrated in the following table.

| Physical Properties | |
| --- | --- |
| Tensile strength, p.s.i. | 675 |
| Elongation, percent | 68 |
| Durometer, Shore A | 80 |
| Tear strength lb./in. | 51 |
| Thermal conductivity, cal. cm.$^{-1}$ sec.$^{-1}$ °C.$^{-1}$ | $9.2 \times 10^{-4}$ |

EXAMPLE 4

(a) The procedure of Example 3(a) is repeated except that 76 parts of silicon nitride particles and 5 parts of nickel flakes are mixed with 19 parts of the vinyl terminated dimethylpolysiloxane.

(b) About 4.7 parts of a methylhydrogenpolysiloxane having an Si:H mole ratio of 3:2 is added to the mixture prepared in Example 4(a) above. The resultant composition is mixed with the platinum styrene complex in such an amount that 10 ppm of elemental platinum is present in the composition, then formed into ASTM slabs and cured for 30 minutes at 175° C.

The physical properties are illustrated in the following table.

| Physical Properties | |
| --- | --- |
| Tensile strength, p.s.i. | 585 |
| Elongation, percent | 86 |
| Durometer, Shore A | 69 |
| Thermal conductivity cal. cm.$^{-1}$ sec.$^{-1}$ °C.$^{-1}$ | $7.4 \times 10^{-4}$ |

EXAMPLE 5

(a) The procedure of Example 3(a) is repeated, except that 8.3 parts of silicon nitride particles and 57.8 parts of zinc oxide are mixed with 34 parts of the vinyl-terminated dimethylpolysiloxane.

(b) About 4.7 parts of a methylhydrogenpolysiloxane having an Si:H mole ratio of 3:2 is added to the mixture prepared in Example 5(a) above. The resultant composition is mixed with the platinum styrene complex in such an amount that 10 ppm of elemental platinum is present in the composition, then formed into ASTM slabs and cured for 30 minutes at 175° C.

The physical properties are illustrated in the following table.

| Physical Properties | |
| --- | --- |
| Tensile strength, p.s.i. | 560 |
| Elongation, percent | 126 |
| Durometer, Shore A | 63 |
| Tear strength lb./in. | 57 |
| Thermal conductivity cal. cm.$^{-1}$ sec.$^{-1}$ °C.$^{-1}$ | $6.1 \times 10^{-4}$ |

COMPARISON EXAMPLE $V_1$ (a) The procedure of Example 3(a) is repeated except that 67.4 parts of zinc oxide are substituted for the silicon nitride particles and 32.6 parts of vinyl-terminated dimethylpolysiloxane are substituted for the 30.3 parts of vinyl-terminated dimethylpolysiloxane.

(b) About 1.7 parts of a methylhydrogenpolysiloxane having an Si:H mole ratio of 3:2 is added to the mixture prepared in Comparison Example $V_1$(a) above. The resultant composition, which contains about 76 percent by weight of zinc oxide, is mixed with the platinum styrene complex in such an amount that 10 ppm of elemental platinum is present in the composition, then formed into ASTM slabs and cured for 30 minutes at 175° C.

| Physical Properties | |
| --- | --- |
| Tensile strength, p.s.i. | 199 |
| Elongation, percent | 125 |
| Durometer, Shore A | 38 |
| Tear strength, lb./in. | 24 |
| Thermal conductivity cal. cm.$^{-1}$ sec.$^{-1}$ °C.$^{-1}$ | $7.3 \times 10^{-4}$ |

COMPARISON EXAMPLE $V_2$ (a) The procedure of Example 3(a) is repeated, except that 66 parts of zinc oxide are mixed with 34 parts of the vinyl terminated dimethylpolysiloxane.

(b) About 4.7 parts of a methylhydrogenpolysiloxane having an Si:H mole ratio of 3:2 is added to the mixture prepared in Comparison Example $V_2$(a) above. The resultant composition is mixed with the platinum styrene complex in such an amount that 10 ppm of elemental platinum is present in the composition, then formed into ASTM slabs and cured for 30 minutes at 175° C.

The physical properties are illustrated in the following table.

| Physical Properties | |
| --- | --- |
| Tensile strength, p.s.i. | 632 |
| Elongation, percent | 143 |
| Durometer, Shore A | 66 |
| Tear strength, lb./in. | 60 |
| Thermal conductivity cal. cm.$^{-1}$ sec.$^{-1}$ °C.$^{-1}$ | $5.5 \times 10^{-4}$ |

What is claimed is:

1. A thermally conductive organopolysiloxane composition comprising (a) an organopolysiloxane having an average of at least two aliphatically unsaturated hydrocarbon radicals per molecule, (b) an organohydrogenpolysiloxane having an average of at least two Si-bonded hydrogen atoms per molecule, (c) a catalyst capable of promoting the addition of the Si-bonded hydrogen atoms to the aliphatically unsaturated hydrocarbon radicals and (d) from about 30 to 95 percent by weight of filler based on the weight of the composition, of which at least 10 percent by weight of the filler is silicon nitride particles.

2. The composition of claim 1, wherein the silicon nitride particles are present in an amount of from 30 to 100 percent by weight based on the weight of the filler.

3. The composition of claim 1, wherein the catalyst is platinum.

4. The composition of claim 1, wherein the organopolysiloxane (a) having aliphatically unsaturated hydrocarbon radicals has recurring units of the formula

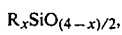

where R is selected from the group consisting of monovalent hydrocarbon radicals and halogenated monovalent hydrocarbon radicals having from 1 to 18 carbon atoms, in which an average of at least two of the monovalent hydrocarbon radicals per molecule contain aliphatic unsaturation and x is an integer of from 1 to 3, with an average value of from about 1.7 to about 2.1.

5. The composition of claim 4, wherein the organopolysiloxane (a) has a viscosity of from 5 to 500,000 mPa.s at 25° C.

6. The composition of claim 1, wherein the organohydrogenpolysiloxane (b) has the formula

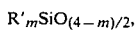

where R' is selected from the group consisting of hydrogen, a monovalent hydrocarbon radical and a halogenated monovalent hydrocarbon radical, in which an average of at least two Si-bonded hydrogen atoms are present per molecule and m is 1, 2 or 3.

7. The composition of claim 6, wherein the organohydrogenpolysiloxane has a viscosity of from 10 to 50,000 mPa.s at 25° C.

8. The composition of claim 1, wherein the composition contains an inhibitor which inhibits the catalyst addition reaction.

9. The composition of claim 1, wherein the organopolysiloxane composition contains additional filler.

10. A process for preparing a thermally conductive elastomer which comprises mixing (a) an organopolysiloxane having an average of at least two aliphatically unsaturated hydrocarbon radicals per molecule with (b) an organohydrogenpolysiloxane having an average of at least two Si-bonded hydrogen atoms per molecule, (c) a catalyst capable of promoting the addition of the Si-bonded hydrogen atoms to the aliphatically unsaturated hydrocarbon radicals and (d) from about 30 to 95 percent by weight of filler based on the weight of the composition, of which at least 10 percent by weight of the filler is silicon nitride particles.

11. The process of claim 10, wherein the silicon nitride particles are present in an amount of from 30 to 100 percent by weight based on the weight of the filler.

12. The process of claim 10, wherein the catalyst is platinum.

13. The process of claim 10, wherein the composition contains an inhibitor which inhibits the catalyst addition reaction.

14. The process of claim 10, wherein the composition is heated to a temperature above 50° C.

15. The process of claim 14, wherein the composition is heated to a temperature sufficient to volatilize the inhibitor.

16. The elastomer prepared in accordance with the process of claim 10.

17. The elastomer prepared in accordance with the process of claim 14.

* * * * *

UNITED STATES PATENT AND TRADEMARK OFFICE
CERTIFICATE OF CORRECTION

PATENT NO. : 4,544,696

DATED : October 1, 1985

INVENTOR(S) : Marie J. Streusand, John C. Getson and Richard C. McAfee

It is certified that error appears in the above-identified patent and that said Letters Patent is hereby corrected as shown below:

Column 1, line 14, delete "3,499,856" and insert ---3,499,859---.

Column 1, line 23, delete "3,499,856" and insert ---3,499,859---.

Signed and Sealed this

Fifteenth Day of December, 1987

*Attest:*

DONALD J. QUIGG

*Attesting Officer*  *Commissioner of Patents and Trademarks*